(12) United States Patent
Mancuso

(10) Patent No.: US 12,454,178 B1
(45) Date of Patent: Oct. 28, 2025

(54) TORQUE CONTROL BRACE FOR A DIFFERENTIAL HOUSING MOUNTED IN AN INDEPENDENT SUSPENSION VEHICLE

(71) Applicant: Louis P. Mancuso, Hampton Bays, NY (US)

(72) Inventor: Louis P. Mancuso, Hampton Bays, NY (US)

( * ) Notice: Subject to any disclaimer, the term of this patent is extended or adjusted under 35 U.S.C. 154(b) by 0 days.

(21) Appl. No.: 18/752,295

(22) Filed: Jun. 24, 2024

Related U.S. Application Data

(60) Provisional application No. 63/524,137, filed on Jun. 29, 2023.

(51) Int. Cl.
B60K 17/16 (2006.01)

(52) U.S. Cl.
CPC .................................. B60K 17/165 (2013.01)

(58) Field of Classification Search
CPC ...... B60K 17/165; B60K 17/24; B60K 17/20; B60K 17/18; B60G 17/165; B60G 2204/19; F16H 57/025
See application file for complete search history.

(56) References Cited

U.S. PATENT DOCUMENTS

| | | | | |
|---|---|---|---|---|
| 4,652,009 A | * | 3/1987 | Ando ....................... | B60G 3/24 267/248 |
| 5,833,026 A | * | 11/1998 | Zetterstrom ........... | B60G 3/202 280/124.135 |
| 6,357,769 B1 | * | 3/2002 | Omundson .......... | B60G 11/465 280/798 |

* cited by examiner

*Primary Examiner* — Jason D Shanske
*Assistant Examiner* — Matthew James O'Neill
(74) *Attorney, Agent, or Firm* — BKDowd Law, P.C.; Betsy Kingsbury Dowd, Esq.

(57) ABSTRACT

A brace for controlling torque of a differential housing mounted in a vehicle having independent suspension includes a three-sided upper frame portion, and a mounting portion positioned below the upper frame portion and removably attachable thereto, which includes through-holes configured to hard-mount it to a frame or cross-member of the vehicle. The brace also includes a lower portion, which is separable from the upper frame portion for mounting over and behind a yoke of the differential, configured to form an inner perimetral surface in cooperation with the upper inner perimetral surface of the upper frame portion, and which is configured to lightly pinch the differential housing in use. The brace may include cushioning pads on the inner perimetral surface.

18 Claims, 6 Drawing Sheets

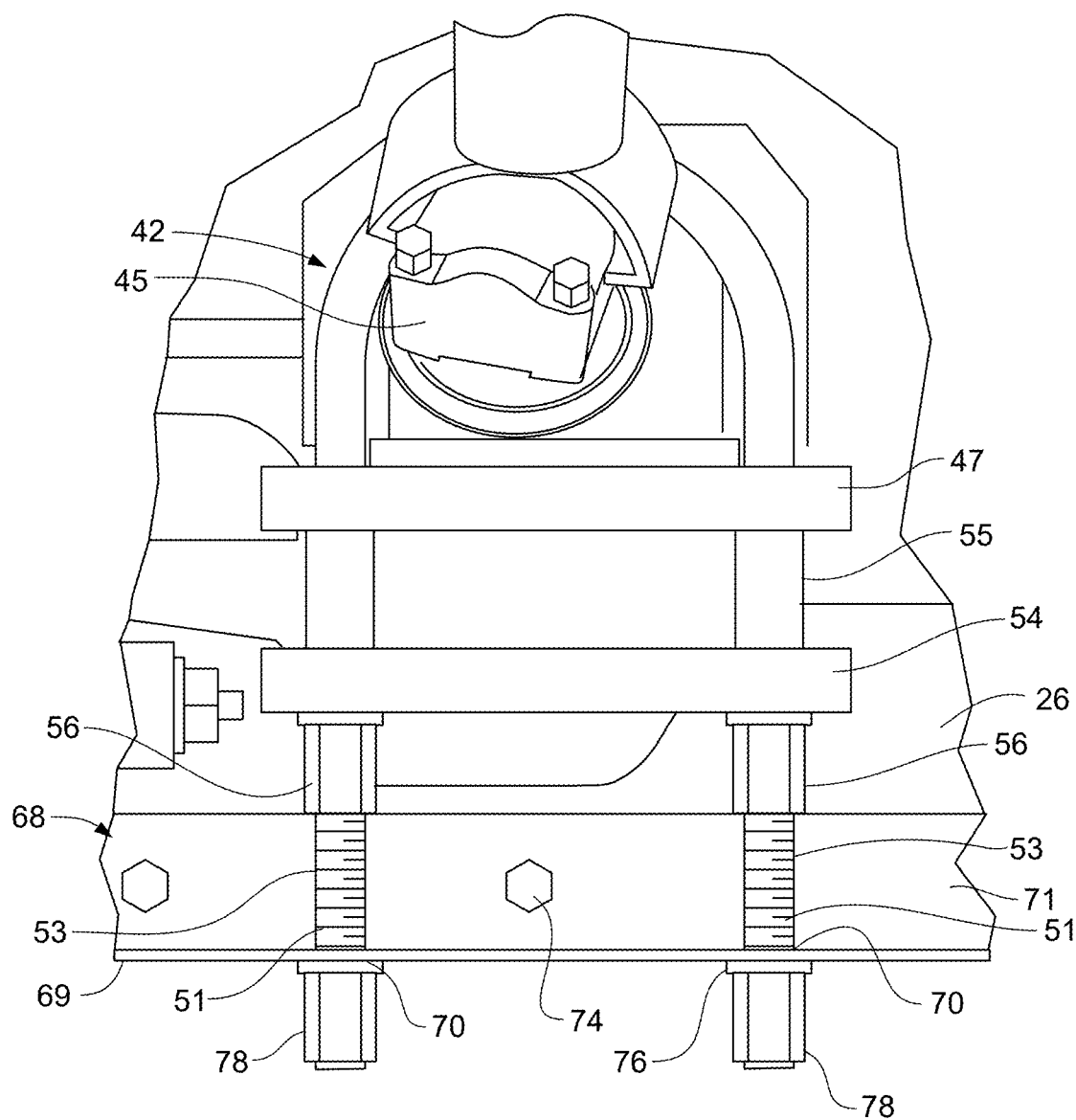

TORQUE CONTROL BRACE FOR A DIFFERENTIAL HOUSING MOUNTED IN AN INDEPENDENT SUSPENSION VEHICLE

CROSS-REFERENCE TO RELATED APPLICATIONS

This application claims the benefit of and priority to U.S. Provisional Application Ser. No. 63/524,137 entitled "TORQUE CONTROL BRACE FOR A DIFFERENTIAL HOUSING MOUNTED IN AN INDEPENDENT SUSPENSION VEHICLE," filed Jun. 29, 2023, the entirety of which is hereby incorporated herein by reference thereto.

FIELD OF DISCLOSURE

The present disclosure relates generally to the arrangement of the differential in independent suspension vehicles and, in particular, to devices for mitigating damage to differentials in independent suspension vehicles.

BACKGROUND

Independent suspension systems with differentials, also referred to as independent differentials, are used in most cars and trucks sold today to provide a smoother ride and maneuverability around curves. However, while independent differentials provide the occupants of the vehicle a comfortable ride, they are subject to failure. In particular, they are made of cast aluminum and are prone to failure in certain areas, such as in the mounts and bushings. For example, the mounts can snap like chicken bones in heavy accelerating situations. Trucks that may also be used as "working" trucks for plowing or other tasks, which require an attachment on the front of the truck for pushing a load, are particularly subject to breakage or cracking at the mounting points of the differential from such use.

Failure of the mount or bushing of the differential can occur in almost any car or truck, including those sold under the GM®, Dodge®, Ford®, Toyota®, Nissan®, and Jeep® brand names, and in all muscle cars sold today. The failure, cracking, or breakage of a differential mount or bushing in these vehicles can be caused by high torque, cold temperatures, plowing snow, larger tires than the original stock tires being used on the vehicle, or after-market lift kits being installed and used. In most cases, the driver of the vehicle will not be aware that damage has occurred at the differential mount or bushing until catastrophic damage occurs as a result of the compromised differential. For example, the undetected damaged differential mount can further lead to wrecked housings, thrown CV shafts, ruined bearings, and internal cracks in the axle shafts, any one or more of which can lead to sudden, total loss of vehicle operation.

There have been replacement, and remanufactured, differentials developed by others to replace a damaged, front differential, which are sold as after-market replacements. However, these options are expensive, and do not address the further damage that can be caused once the differential mount is damaged. Furthermore, there is no known fix, or after-market replacement, for a snapped mount of a rear differential.

Accordingly, there is a need for a device that is configured to prohibit torque or twisting of the differential during operation of a vehicle and subsequent damage to the mounts. There is also a need for the device to be suitable for installation with both a stock differential to mitigate, or prevent, damage to mounts of the stock differential, and a mount that has already broken or cracked, in order to prevent further damage to the damaged mount(s) and to other elements of the vehicle. There is also a need for such a device that can be adjusted to fit any independent suspension style differential, as well as both the front and rear end differential.

SUMMARY

Features of the disclosure will become apparent from the following detailed description considered in conjunction with the accompanying drawings. It is to be understood, however, that the drawings are designed as an illustration only and not as a definition of the limits of this disclosure.

The present disclosure is directed to a device that is configured to prohibit, or mitigate, torque or twisting of a differential housing encasing a differential, and subsequent damage to the mounting points of the differential, also referred to as the differential mounts, during operation of a vehicle. The device, referred to herein as a brace, is suitable for installation with both a stock differential and a damaged differential housing, that is, a differential housing that has already broken or cracked at one of the mounting points, for example, in order to prevent further damage to the differential housing, differential, and to other elements of the vehicle.

The present disclosure is also directed to a device that is configured to prohibit, or mitigate, torque or twisting of the differential housing encasing a differential, and subsequent damage to the mounting points of the differential, which can also be adjusted to fit any independent suspension style differential, as well as both the front and rear end differential.

The device, or brace, is configured to keep a differential housing and differential encased therein in alignment, as originally mounted on the vehicle, even if portions of the differential housing, e.g., the mounting points, are already broken or cracked. If installed on stock differential housings with no damage, the brace is configured to prevent damage to occur, for example, by resisting and, preferably, prohibiting torque or twisting of the mounting points of the differential housing during use of the vehicle. The brace of the present invention may be configured to fit any independent suspension style differential, front or rear end.

In embodiments, the brace is configured to fit a specific vehicle.

In other embodiments, the brace is configured to be more universal, with adjustment elements that are manually adjustable upon installation to tighten the brace around the differential housing. This allows the brace to fit onto more than one vehicle, and in more than one mounting orientation, on a frame or cross-member of a vehicle.

The present disclosure is also directed to a brace for controlling torque of a differential housing mounted in a vehicle having independent suspension, which includes an upper frame portion, including three sides in embodiments, and a mounting portion positioned below the upper frame portion and removably attachable thereto. The mounting portion includes through-holes configured to hard-mount it to a frame or cross-member of the vehicle. The brace may also include a lower portion configured to form an inner perimetral surface in cooperation with an upper inner perimetral surface of the upper frame portion. The inner perimetral surface is configured to lightly pinch the differential housing in use.

The present disclosure is also directed to a brace for controlling torque of a differential housing, which encases a differential, mounted in a vehicle having independent suspension, including an upper frame portion and a mounting portion. The upper frame portion includes an upper inner perimetral surface configured to contact the differential housing. The mounting portion is positioned below and connectedly extends from the upper frame portion, and includes a pair of legs connected to, and extending downward from, each of a left side and a right side of the upper frame portion, wherein the mounting portion is secured, in use, to a frame or cross-member of the vehicle and cooperates with the upper frame portion to restrain the differential housing from twisting.

In embodiments, the brace further includes a lower frame portion that is separable from the upper frame portion. The lower frame portion includes a lower inner perimetral surface, wherein the lower inner perimetral surface and the upper inner perimetral surface of the upper frame portion together form an inner perimetral surface. The upper inner perimetral surface of the upper frame portion and the lower inner perimetral surface of the lower frame portion in an installed position, in use, cooperate to surround and restrain the differential housing, thereby preventing twisting of the differential housing.

In embodiments, the pair of legs are a pair of threaded legs, whereby the brace, in use, is secured to the frame or cross-member of the vehicle via the pair of threaded legs.

In embodiments, cushioning pads are included on the inner perimetral surface.

The cushioning pads may be formed of an elastic material, which may be rubber.

In embodiments, the cushioning pads have an inner surface that is curved.

In further embodiments, the brace may include an adjustable bar including two apertures, wherein each threaded leg of the pair of threaded legs extends through one of the two apertures, and the adjustable bar is held in position by nuts threaded onto an end of each of the threaded legs below the adjustable bar.

The brace may further include a pair of spacers, each spacer formed as a hollow cylinder through which one of the threaded legs is positioned. Each spacer is positioned between, and in contact with, the adjustable bar and the lower frame portion, such that the adjustable bar and the lower frame portion are connectedly adjustable in a vertical position relative to the upper frame portion, whereby vertical rotation of the nuts, in use, simultaneously adjusts the vertical position of the adjustable bar and the lower frame portion including the lower inner perimetral surface relative to the upper frame portion.

In embodiments, the mounting portion includes a right-angle bracket with through-holes configured, in use, to secure the brace to the frame or cross-member of the vehicle.

In additional embodiments, the right-angle bracket includes a plate perpendicular to the upper frame portion, wherein the through-holes are slotted through-holes configured, in use, to adjust a position of the brace relative to a front portion of the differential housing.

In embodiments, the inner perimetral surface is rectangular.

In other embodiments, the inner perimetral surface is elliptical.

Embodiments of the brace may be formed of steel.

In embodiments, the lower frame portion is integral with the mounting portion.

In embodiments, the upper inner perimetral surface of the upper frame portion is formed from an upper side of the upper frame portion adjoined to a left side and a right side, which are in a shape of an upside down U.

In embodiments, the left side and the right side of the brace are perpendicular to the upper side of the upper frame portion such that the upper inner perimetral surface cooperates with the lower inner surface in use to form a rectangular shape.

Any of the embodiments of the brace of the present disclosure is adaptable for mounting with the differential housing encasing one of a front differential and a rear differential.

Any of the embodiments of the brace of the present disclosure is installable on a damaged differential housing, the brace thereby preventing further damage by resisting torque and twisting of one or more mounting points of the differential housing during use of the vehicle.

Additionally, any of the embodiments of the brace of the present disclosure is installable on a stock differential housing, the brace mitigating or preventing damage to mounting points of the stock differential housing by resisting torque and twisting of the mounting points of the differential housing during use of the vehicle.

In addition to the above aspects of the present disclosure, additional aspects, objects, features and advantages will be apparent from the embodiments presented in the following description and in connection with the accompanying drawings.

BRIEF DESCRIPTION OF THE DRAWINGS

The drawings constitute a part of this disclosure and include examples, which may be implemented in various forms. It is to be understood that in some instances, various aspects of the disclosure may be shown exaggerated or enlarged to facilitate understanding. The teaching of the disclosure can be readily understood by considering the detailed description in conjunction with the accompanying drawings, which are briefly described below.

FIG. 2C is a pictorial representation of the brace of FIG. 2A, 2B in an installed position in use, mounted via the angle bracket onto a cross-member of a vehicle.

Figure 1A:
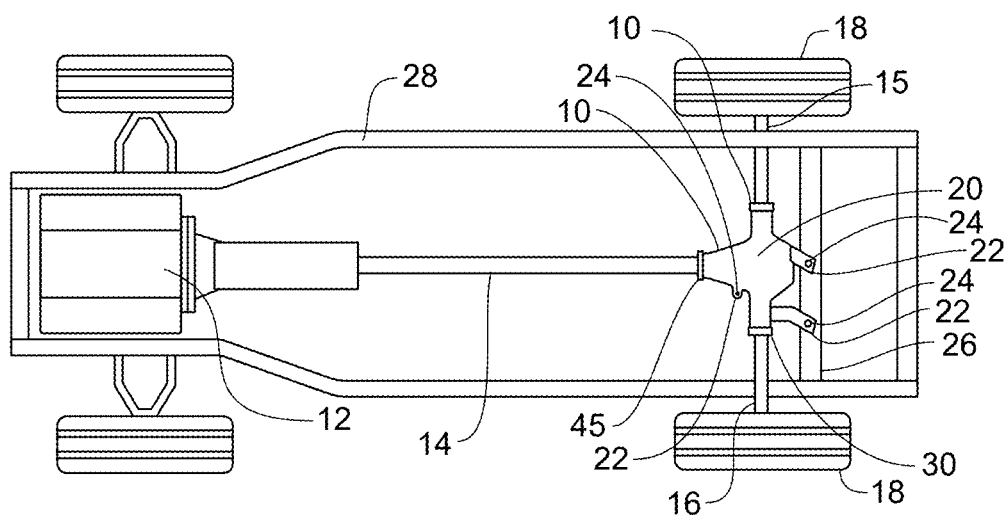
FIG. 1A is a representation of a differential housing mounted in a prior art independent rear suspension vehicle to a cross member and chassis of the vehicle.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings; however, the disclosed embodiments are merely examples of the disclosure, which may be embodied in various forms. It should be apparent to those skilled in the art that the described embodiments provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present disclosure of a device, or brace, for torque control of a differential housing mounted in an independent suspension vehicle, as defined herein and equivalents thereto. Well-known functions or constructions and repetitive matter are not described in detail to avoid obscuring the present disclosure in unnecessary or redundant detail. Therefore, specific structural and functional details disclosed herein are not to be interpreted as limiting. In this description, as well as in the drawings, like-referenced numbers represent elements which may perform the same, similar, or equivalent functions.

Throughout the description, where items are described as having, including, or comprising one or more specific components or features, or where methods are described as having, including, or comprising one or more specific steps, it is contemplated that, additionally, there are items of the present disclosure that consist essentially of, or consist of, the one or more recited components or features, and that there are methods according to the present disclosure that consist essentially of, or consist of, the one or more recited processing steps.

The present disclosure is directed to a device, or brace, for torque control of a differential housing for an independent suspension vehicle.

The term "brace" is used herein, to describe the device of the present disclosure in accordance with its plain meaning, in that the device is configured to fit around a differential housing to support it, and, in particular, to prevent torque and twisting of the differential housing at its mounting points.

Figure 1B:
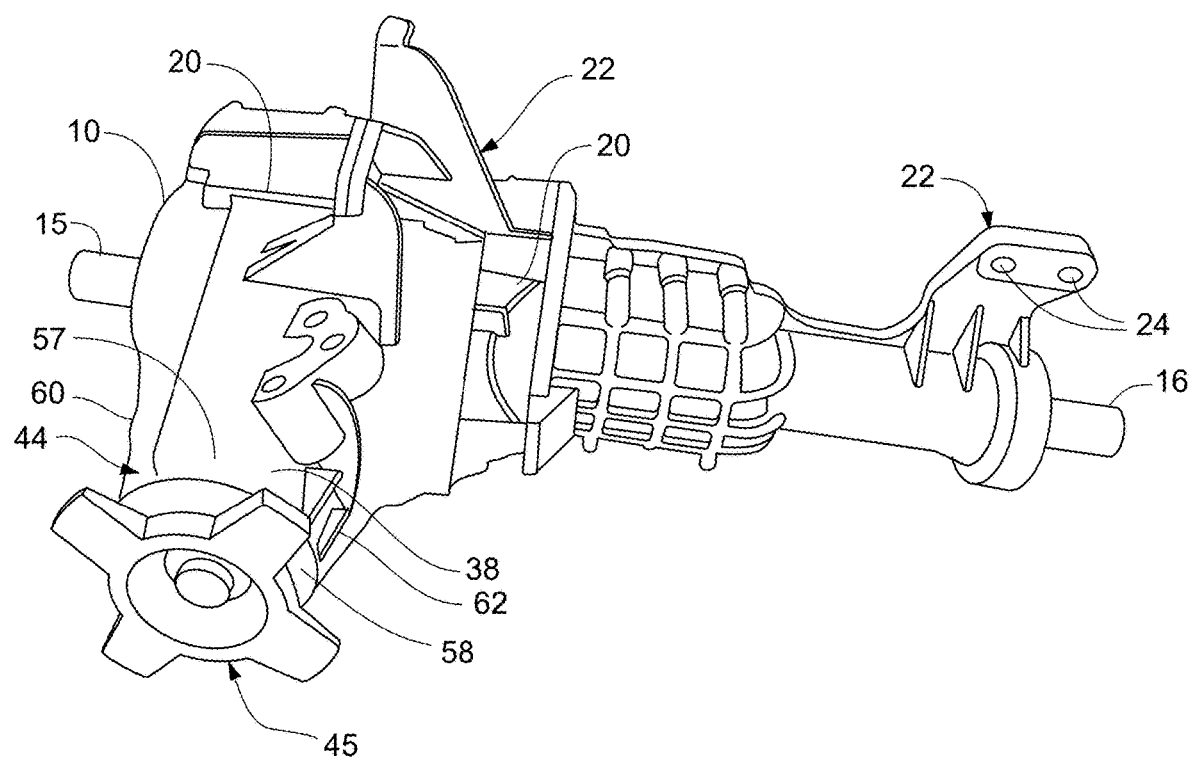
FIG. 1B is a representation of the differential housing of FIG. 1A.

Referring to the simplified representation shown in FIG. 1A, an independent rear suspension vehicle includes a differential housing 10, also shown in FIG. 1B, which houses a ring gear, differential carrier, and associated components, referred to collectively as a differential 20, configured to transmit torque from the vehicle's engine 12 via a driveshaft 14 and two independent axles 15,16 to each of the rear wheels 18. The differential 20 is operatively connected to the driveshaft 14 and each of the two independent axles 15,16 and is configured to allow each of the rear wheels 18 to move independently and at varying speeds. Constant velocity (CV) joints (not shown) are also commonly used between each wheel 18 and its associated independent axle 15, 16 that connects to the differential 20. This configuration allows a smooth ride around curves, and on rough terrain, for example.

In vehicles without independent suspension, there is a solid axle that would extend from one rear wheel to the other rear wheel. In these vehicles, the differential and differential housing is integrated with, or mounted on, the axle. In contrast, referring to FIG. 1A, the differential housing 10 of independent suspension vehicles must be fixed to a chassis 28 or cross-member 26 of the vehicle. The differential housing 10, which is typically formed as a unitary body cast in a light metal, such as aluminum, typically includes at least two protrusions 22 integrally formed with the housing 10, each forming a mounting point for fixing the differential housing 10 to the vehicle. Typically, each protrusion 22, also referred to herein as a mounting point 22, includes a mounting through-hole 24 for inserting a bolt therethrough. Still referring to FIG. 1A, the differential housing 10 may then be bolted at each protrusion 22, via mounting through-hole 24, to the cross-member 26, for example, or chassis 28 of the vehicle.

These protrusions 22, or mounting points 22, via which the differential housing 20 is mounted to the vehicle, and other portions of the differential housing 20, such as the bushings 30 around the independent axles 16, 18, are especially prone to damage and breakage, for example, from twisting and torque induced while the vehicle is operated over rough terrain, or as a work truck to move or lift loads.

Figure 2A:
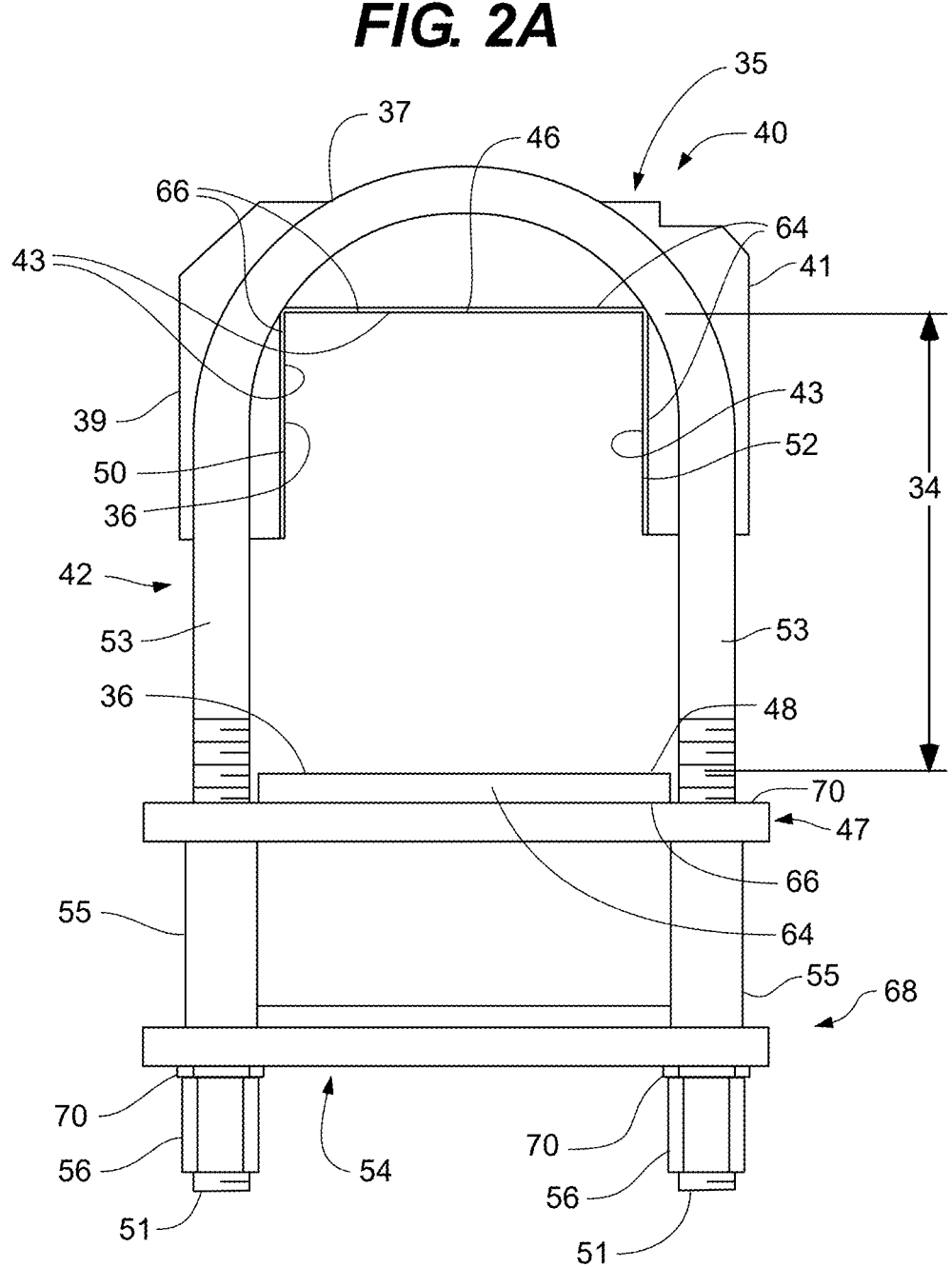
FIG. 2A is a pictorial representation of an embodiment of a brace of the present disclosure configured to fit around a portion of the differential housing of an independent suspension vehicle.

Referring to FIG. 2A, as well as to FIGS. 1A and 1B, a brace 40 of the present disclosure includes an upper frame portion 42 configured to fit on top of, around two sides, and onto a front portion 44 of the differential housing 10, and behind a yoke 45 that is configured to align and mount the differential 20 to the driveshaft 14 of an independent suspension vehicle. In embodiments, a portion 35 of the upper frame portion 42 that provides an upper inner perimetral surface 43 to fit to the differential housing 10 may be u-shaped, and configured to provide three sides of an inner perimetral surface 36 of the assembled brace in use.

Figure 3:
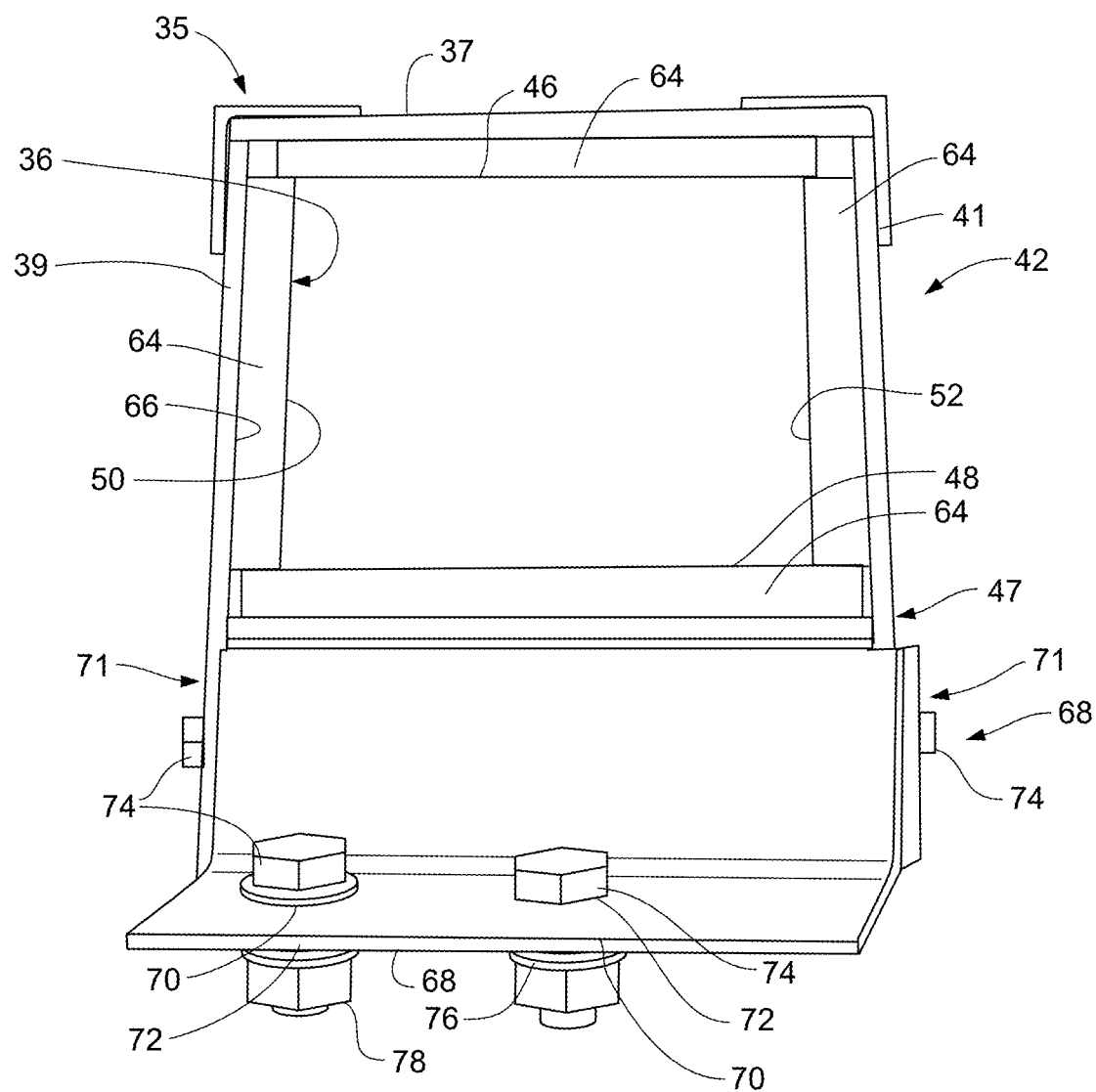
FIG. 3 is a pictorial representation of another embodiment of a brace of the present disclosure configured to fit around a portion of the differential housing of an independent suspension vehicle.

In embodiments, referring to FIG. 2A and FIG. 3, the upper frame portion 42 includes three upper sides, i.e., upper side 37, left side 39, and right side 41, of the portion 35 of the upper frame portion 42 which are fixed in position relative to each other. The upper side 37, left side 39, and right side 41 include an upper inner surface 46, a left inner surface 50, and a right inner surface 52, respectively, that form the upper inner perimetral surface 43 of the inner perimetral surface 36 of the brace 40 as assembled. In order to install an embodiment of the brace 40 onto the front housing 44, and behind the yoke 45, a lower frame portion 47, which includes a lower inner surface 48 of the inner perimetral surface 36, must be separable from the upper frame portion 42. After positioning the upper frame portion 42 onto the front portion 44 of the differential housing 10, the lower frame portion 47 is mounted below and behind the yoke 45 and secured to the upper frame portion 42, and, in embodiments, adjusted, such that the lower inner surface 48 in cooperation with the upper inner perimetral surface 43 form the inner perimetral surface 36 that is dimensioned to hug, or lightly pinch, the front portion 44 of the differential housing 10 in use.

The upper inner perimetral surface 43 is dimensioned to restrain, in embodiments, to hug, or lightly pinch, portions of an outer perimeter 38 of the front portion 44 of the differential housing 10 in use. In embodiments, the portion 35 of the upper frame portion 42 that provides the upper inner perimetral surface 43 is in the shape of an up-side down U in the installed position. The upper inner perimetral surface 43 may be formed from an up-side down U that is curved, or, in embodiments, the upper inner perimetral surface 43 may be formed from an up-side down U having its legs (left side 39, right side 41 of FIG. 2A) perpendicular to the upper side 37 adjoining the legs, i.e., left side 39 and right side 41, so that in use, as installed, the inner perimetral surface 36 formed from the upper inner perimetral surface 43 and the lower inner surface 48 of the lower frame portion 47 is in the shape of a rectangle.

In embodiments, referring to FIG. 3, for example, a shape, dimensions, and position of the inner perimetral surface 36 relative to the upper frame portion 42 are fixed and are configured for installation on a specific differential housing and on a specific vehicle.

Referring to FIGS. 2A-3, in embodiments, the brace of the present disclosure also includes a mounting portion 68 positioned below the lower frame portion 47, which is configured to secure the brace to a frame or cross-member of a vehicle. In embodiments, the mounting portion 68 extends downward from the upper frame portion 42. In embodiments, the mounting portion 68 includes a pair of legs 51, each leg extending downward along one of the left side 39 and the right side 41 of the upper frame portion 42.

Figure 2B:
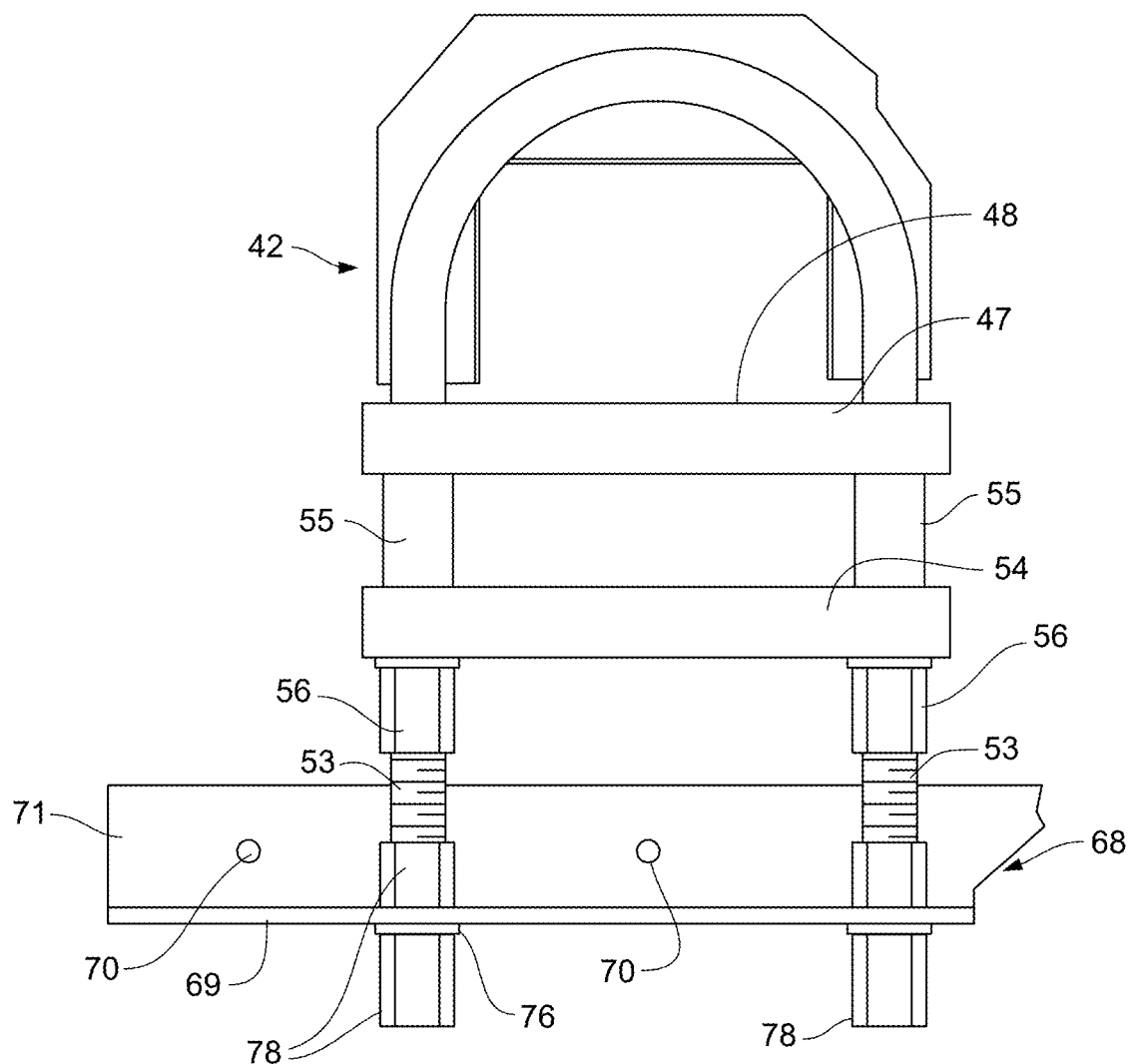
FIG. 2B is a pictorial representation of the brace of FIG. 2A with an angle bracket for mounting to a cross-member of a vehicle via an angle bracket.

In embodiments, referring to FIGS. 2A-2C, the pair of legs 51 of the mounting portion 68 are a pair of threaded legs 53, which are connected to, and extend downward from, the upper frame portion 42. In embodiments, each leg 53 of the pair of threaded legs 53 extends downward from one of the left side 39 and the right side 41 of the upper frame portion 42. The brace may be secured to a frame or cross-member of the vehicle via the pair of threaded legs 53 as described herein.

Referring to FIG. 3, in embodiments of the device 40, the lower frame portion 47 is integral with the mounting portion 68. In embodiments, the pair of legs 51 extend downward from each of the left side 39 and the right side 41 of the upper frame portion 42, and below the lower frame portion 47. Through-holes (not shown) are provided in the left 39 and right side 41 and along sides 71 of the mounting portion 68 for mounting bolts 74 therethrough to hard-mount the mounting portion 68, and lower frame portion 47 integral therewith, to the left side 39 and the right side 41 of the upper frame portion 42 via conventional hardware. The mounting portion 68 with integral lower frame portion 47 may be configured to fit, as installed, and in cooperation with the upper frame portion 42, a specific differential housing 10 in a specific vehicle.

As one of ordinary skill in the art will appreciate, the dimensions of each of the upper frame portion 42 and the lower frame portion 47, including the size and shape of the mounting portion 68 and the position of through holes 70 therein for mounting to a vehicle, may be configured differently for different vehicles and differential housings 10 without departing from the spirit and scope of the invention.

Referring to FIG. 2A, in embodiments, the lower frame portion 47 may be adjustable in its vertical position relative to the upper frame portion 42 such that the lower inner surface 48 may be adjusted upward or downward to vary a distance 34 between the upper inner surface 46 and the lower inner surface 48. This provides additional flexibility in adjusting the fit of the brace 40 around the front portion 44 of the differential housing 10 in the vertical direction, after installation of the upper frame portion 42 over the yoke 45 and onto the front portion 44.

In embodiments, referring to FIGS. 2A, 2B, and 2C, the brace 40 may further include an adjustable bar 54 and spacers 55, wherein the spacers 55 are hollow cylinders sandwiched between, and in contact with, each of the lower frame portion 47 and the adjustable bar 54. The adjustable bar 54, spacers 55, and lower frame portion 47 are configured to move together along a vertical direction, as further described herein, and may, in embodiments, be integral with each other. For example, a top of each spacer may be welded along its outer sides to a bottom of the lower frame portion 47, and a bottom of each spacer may be welded along its outer sides to a top of the adjustable bar 54.

To allow vertical translation of the lower frame portion 47 via the adjustable bar 45 and spacers, the upper frame portion 42 may also include a pair of threaded legs 53, each of which extends downwardly from the left side 39 and the right side 41 of the upper frame portion 42 and freely through through-holes 70 aligned to each other in the lower frame portion 47 and in the adjustable bar 54 and through the hollow interior of the spacers 55. The upper frame portion 42 may also include a nut 56 threaded onto a portion of each of the threaded legs 53 that extends through and below the adjustable bar 54, wherein each nut 56 is positioned below and operatively contacts the adjustable bar 54. Rotation of the nuts 55 operates to adjust a vertical position of the adjustable bar 54, i.e., to raise or lower the adjustable bar 54, together with the lower frame portion 47 operatively connected thereto via the spacers 55, such that the distance 34 may be set to pinch the brace 40 in the vertical direction against the front portion 44 of the differential housing 10.

Referring again to FIG. 1B, the front portion 44 of the differential housing 10 on most vehicles is also tapered, having a cross-section that increases away from the yoke 46 and toward the differential 20. Accordingly, as the brace 40 is pushed further onto the front portion 44, the brace 40 will have a tighter fit around the differential housing 10.

Accordingly, in further embodiments, referring for example to FIG. 3, the mounting portion 68, may include a right angle bracket having a plate 69 perpendicular to the upper frame portion 42, and may further include either through-holes 70 in the plate 69 for mounting to the frame or cross-member of the vehicle. In embodiments, the through-holes 70 may be slots 72 oriented in use along a longitudinal axis of the front portion 44, that allows adjustability in the mounting position of the brace 40 relative to the longitudinal axis of the front portion 44. As shown in FIG. 3, conventional mounting hardware, such as bolts 74 inserted through through-holes 70, or slots 72, in the mounting portion 68 may be used, together with washers 76 and nuts 78, to secure the brace 40 to the frame or cross-member of a vehicle.

For the embodiment shown in FIGS. 2A-2C, like that shown in FIG. 3, in order to install the brace 40 onto the front housing 44, the lower frame portion 47 as well as the adjustable bar 54 together with the spacers 55 must be separable from the upper frame portion 42. Once the upper frame portion 42 is positioned onto the front portion 44 of the differential housing 10, the lower frame portion 47, and integral adjustable bar 54, may be mounted to the upper frame portion 42, and adjusted to the desired vertical position, such that the lower inner surface 48 in cooperation with the upper inner surface 46, the left inner surface 50, and the right inner surface 52, form the inner perimetral surface 36 that is dimensioned to hug, or lightly pinch, the front portion 44 of the differential housing 10 in use.

Referring also to FIGS. 2B and 2C, in embodiments, the mounting portion 68 is then positioned below the adjustable bar 54 and hard-mounted to both the brace 40 and to the frame or, as shown in FIG. 2C, to the cross-member 26 of the vehicle.

Referring to FIG. 2C, the mounting portion 68, in embodiments, may be a right angle bracket, which includes plate 69 oriented perpendicular to the upper frame portion 42 as installed, and which may further include through-holes 70 in the plate 69. In the embodiment of FIG. 2C, the mounting portion 68 is bolted to the brace 40 via the threaded legs 53 extending through the through-holes 70 in the plate 69 aligned thereto, using conventional mounting hardware, such as nuts 78 and washers 76 mounted to the threaded legs 53 from an underside of the plate 69, and in embodiments, on atop side of the plate 69 (see FIG. 2B). Referring to FIG. 2C, the brace 40, with mounting portion 68 mounted thereto, may then be hard-mounted to a frame or cross-member 26 of the vehicle, via the mounting portion 68, using conventional hardware. For example, referring to FIGS. 2B and 2C, the mounting portion 68 may be a right angle bracket which includes a vertical plate 71 perpendicular to the mounting plate 69, which includes through-holes 70 for inserting a bolt 74 therethrough, aligned with through-holes (not shown) provided, for example, in a cross-member 26 of the vehicle. Standard hardware may be used to hard-mount the mounting portion 68, via the through-holes 70 in the vertical plate 71, to the cross-member 26, or frame of the vehicle.

It should be noted that the cross-sectional shape of the outer perimeter 38 of the differential housing 10 in most vehicles is typically substantially circular, or elliptical. In embodiments, the inner perimetral surface 36 may also be of a circular shape; however, this may necessitate additional customization of the dimensions of the device 40.

Referring to the embodiments shown in FIG. 2A and FIG. 3, to effectively control torque and twisting of the differential housing 10, it is not necessary to configure the inner perimetral surface 36 to exactly fit the shape of the outer perimeter 38 of the differential housing 10. Referring also to FIG. 1B, it is sufficient to dimension the inner perimetral surface 36, which may, in embodiments, form rectangular inner perimeters, to contact at least a portion of each of an upper outer surface 57, lower outer surface 58, left outer surface 60, and a right outer surface 62 of the differential housing 10.

In embodiments, the inner perimetral surface 36 is dimensioned such that at least the upper inner surface 46 of the inner perimetral surface 36 contacts a portion of the upper outer surface 57 of the front portion 44 of the differential housing 10, and the lower inner surface 48 of the inner perimetral surface 36 contacts a portion of the lower outer surface 58 of the front portion 44 of the differential housing 10.

The inner perimetral surface 36 of the brace 40, in embodiments, may be an integral inner surface 66 of the upper frame portion 42, such that it is formed of the same material as the remaining portions of the brace 40. In embodiments, the upper frame portion 42 is formed of steel.

In preferred embodiments, however, the inner perimetral surface 36 is formed of a cushioning, or elastic material, such as rubber. In embodiments, the inner perimetral surface 36 may be formed of cushioning pads 64, which may be formed of rubber, bonded onto an integral inner surface 66 of the upper frame portion 42. The cushioning material provides additional contact surface for hugging the differential housing 10, and also allows some movement of the front portion 44 within the brace 40 without stressing the mounting points 22 and other susceptible portions of the differential housing 10.

In further embodiments (not shown) the cushioning pads 64 may be configured to adhere to flat inner surfaces of the upper frame portion 42, and to have an inner surface forming the inner perimetral surface 36, which in embodiments, may be curved to form a better fit around the differential housing 10.

As described herein, the brace 40, with the exception of the cushioning, or rubber pads 64, is formed of steel. Referring to FIG. 3, the upper frame portion 42, in embodiments, which may be u-shaped as described herein, may be formed by welding three plates forming the upper 37, left 39, and right side 41 together at the two corners, using angle brackets for additional support. Similarly, the mounting portion 68 may be welded to a steel plate forming the lower frame portion 47 of the upper frame portion 42 and to additional angle plates that provide support along the adjoining surfaces.

In further embodiments, referring to FIGS. 2A-2C, the upper frame portion 42 may be formed from a steel rounded u-bend, also referred to as a u-bar, wherein the legs have been threaded to form the threaded legs 53. Right-angle steel plates may then be welded to each other and to the upper portion of the u-bend to form the upper side 37, left side 39, and right side 41 of the upper frame portion 42, and in embodiments, cushioning pads 64 are adhered to each of their inner surfaces, to form the upper inner surface 46, left inner surface 48, and right inner surface 52. Preferably, a brace 40 formed of u-bend and angle plates as described herein is installed onto the differential housing 10 with the angle plate facing the differential housing 10.

As described herein, the brace 40 of the present invention is configured to be mounted around the front portion 42 of the differential housing 10, behind the yoke 46 that mounts the housing 10 to the driveshaft 14. Preferably, the brace 40 is dimensioned to fit like a saddle, i.e., to prevent movement of the front portion 42 within the brace 40 around all four sides. The brace 40 advantageously keeps the differential housing 10 and differential 20 aligned, preventing it from moving side to side, or up and down. The brace 40 is not bolted or hard mounted to the differential housing 10, but instead, lightly pinches the differential housing 10, and is further configured, in embodiments, to bolt directly to a frame or cross member (hard mounted) of the vehicle via the mounting portion 68. Depending on the vehicle, and independent suspension arrangement, onto which the brace 40 will be installed, the mounting portion 68 may be in the form of a right angle bracket, as shown, for example, in FIG. 3 and FIGS. 2B, 2C, but may be in any shape that facilitates mounting the brace 40 to the vehicle. As should be clear from the two embodiments shown, the mounting portion 68 may be a right angle bracket configured to be mounted via its vertical plate 71 to the vehicle, or via its (horizontal) mounting plate 69.

Advantageously, the brace 40 of the present disclosure harnesses, or bears, all the extreme amounts of torque and lateral movement that would otherwise be exerted on the mounting points 22 and other areas of the differential that are prone to failure, and transfers that energy into the frame (not shown) or cross member 26 to which the brace 40 is mounted.

EXAMPLE: An embodiment of the brace 40 was mounted in a truck onto a differential housing that had suffered a crack in one of the mounting points. The truck is a lifted, six inch 08 HD2500 Duramax® with 35" tires and an 8½ foot snowplow. No further failures or issues and no increase in the size of the crack have been observed over a period of time of over a year since installed, despite continuing to use the truck on a daily basis, including as a tow trailer.

While particular embodiments of the present disclosure have been particularly shown and described with reference to specific embodiments, it should be apparent to those skilled in the art that the foregoing is illustrative only and not limiting, having been presented by way of example only. It is to be understood that the disclosed embodiments are merely examples of the disclosure, which may be embodied in various forms and detail without departing from the spirit and scope of the disclosure. Therefore, specific structural and functional details disclosed herein are not to be interpreted as limiting. Numerous other embodiments may fall within the scope of the accompanying claims and equivalents thereto.

What is claimed is:

1. A brace for controlling torque of a differential housing, which encases a differential, mounted in a vehicle having independent suspension, comprising:
   an upper frame portion, the upper frame portion including an upper inner perimetral surface configured to contact the differential housing; and
   a mounting portion positioned below and connectedly extending from the upper frame portion, the mounting portion including a pair of legs connected to, and extending downward from, each of a left side and a right side of the upper frame portion, wherein the mounting portion is secured to a frame or cross-member of the vehicle and cooperates with the upper frame portion to restrain the differential housing from twisting,
   wherein the mounting portion includes a right-angle bracket with through-holes configured to secure the brace to the frame or cross-member of the vehicle.

2. The brace of claim 1, the right-angle bracket including a plate perpendicular to the upper frame portion, wherein the through-holes are slotted through-holes configured to adjust a position of the brace relative to a front portion of the differential housing.

3. The brace of claim 1, wherein the brace is adaptable for mounting with the differential housing encasing one of a front differential and a rear differential.

4. The brace of claim 1, wherein the brace is installable on a damaged differential housing, the brace thereby preventing further damage by resisting torque and twisting of one or more mounting points of the differential housing during use of the vehicle.

5. The brace of claim 1, wherein the brace is installable on a stock differential housing, the brace mitigating or preventing damage to mounting points of the stock differential housing by resisting torque and twisting of the mounting points of the differential housing during use of the vehicle.

6. A brace for controlling torque of a differential housing, which encases a differential, mounted in a vehicle having independent suspension, comprising:
   an upper frame portion, the upper frame portion including an upper inner perimetral surface configured to contact the differential housing;
   a mounting portion positioned below and connectedly extending from the upper frame portion, the mounting portion including a pair of legs connected to, and extending downward from, each of a left side and a right side of the upper frame portion, wherein the mounting portion is secured to a frame or cross-member of the vehicle and cooperates with the upper frame portion to restrain the differential housing from twisting; and
   a lower frame portion that is separable from the upper frame portion, the lower frame portion including a lower inner perimetral surface, wherein the lower inner perimetral surface and the upper inner perimetral surface of the upper frame portion together form an inner perimetral surface, whereby the upper inner perimetral surface of the upper frame portion and the lower inner perimetral surface of the lower frame portion in an installed position cooperate to surround and restrain the differential housing, thereby preventing twisting of the differential housing, wherein the pair of legs are a pair of threaded legs, whereby the brace is secured to the frame or cross-member of the vehicle via the pair of threaded legs.

7. The brace of claim 6, further including cushioning pads on the inner perimetral surface.

8. The brace of claim 7, wherein the cushioning pads are formed of an elastic material.

9. The brace of claim 8, wherein the cushioning pads are rubber.

10. The brace of claim 7, wherein the cushioning pads have an inner surface that is curved.

11. The brace of claim 6, further including an adjustable bar including two apertures, wherein each threaded leg of the pair of threaded legs extends through one of the two apertures, the adjustable bar being held in position by nuts threaded onto an end of each of the threaded legs below the adjustable bar.

12. The brace of claim 11, further including a pair of spacers, each spacer formed as a hollow cylinder through which one of the threaded legs is positioned, each spacer being positioned between, and in contact with, the adjustable bar and the lower frame portion, such that the adjustable bar and the lower frame portion are connectedly adjustable in a vertical position relative to the upper frame portion, whereby vertical rotation of the nuts simultaneously adjusts the vertical position of the adjustable bar and the lower frame portion including the lower inner perimetral surface relative to the upper frame portion.

13. The brace of claim 6, wherein the inner perimetral surface is rectangular.

14. The brace of claim 6, wherein the inner perimetral surface is elliptical.

15. The brace of claim 6, wherein the brace is formed of steel.

16. The brace of claim 6, wherein the lower frame portion is integral with the mounting portion.

17. The brace of claim 6, wherein the upper inner perimetral surface of the upper frame portion is formed from an upper side of the upper frame portion adjoined to a left side and a right side, which are in a shape of an upside down U.

18. The brace of claim 17, wherein the left side and the right side are perpendicular to the upper side of the upper frame portion such that the upper inner perimetral surface cooperates with the lower inner surface to form a rectangular shape.

* * * * *